United States Patent
Drysdale et al.

(10) Patent No.: US 7,504,440 B2
(45) Date of Patent: *Mar. 17, 2009

(54) POLY(METH)ACRYLATE COMPOSITIONS CONTAINING AMIDE ACETALS

(75) Inventors: Neville Everton Drysdale, Newark, DE (US); Laura Ann Lewin, Greenville, DE (US); Robert John Barsotti, Franklinville, NJ (US); Patrick Henry Corcoran, Cherry Hill, NJ (US)

(73) Assignee: E.I. du Pont de Nemours & Company, Wilmington, DE (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/241,402

(22) Filed: Sep. 30, 2005

(65) Prior Publication Data

US 2006/0074198 A1    Apr. 6, 2006

Related U.S. Application Data

(60) Provisional application No. 60/615,361, filed on Sep. 30, 2004.

(51) Int. Cl.
- *C08J 3/28* (2006.01)
- *C08F 283/04* (2006.01)
- *C08G 69/48* (2006.01)
- *C08G 18/08* (2006.01)
- *C08L 77/00* (2006.01)

(52) U.S. Cl. ............... 522/134; 525/421; 525/423; 525/424; 525/426; 525/428; 525/431; 528/55; 514/375; 548/218

(58) Field of Classification Search ........... 522/134; 525/421, 423, 424, 426, 428, 431; 528/55; 514/375; 548/218
See application file for complete search history.

(56) References Cited

U.S. PATENT DOCUMENTS

| | | | | |
|---|---|---|---|---|
| 4,628,102 A * | 12/1986 | Goel | ............ | 548/218 |
| 4,654,416 A * | 3/1987 | Goel | ............ | 528/403 |
| 4,661,583 A * | 4/1987 | Goel | ............ | 528/322 |
| 4,661,600 A * | 4/1987 | Goel | ............ | 548/217 |
| 4,680,352 A * | 7/1987 | Janowicz et al. | ............ | 526/147 |
| 4,708,971 A * | 11/1987 | Goel et al. | ............ | 521/167 |
| 4,721,767 A | 1/1988 | Goel | | |
| 4,722,984 A * | 2/1988 | Janowicz | ............ | 526/123.1 |
| 5,587,431 A | 12/1996 | Gridnev et al. | | |
| 7,135,530 B2 * | 11/2006 | Drysdale et al. | ............ | 525/423 |
| 7,230,112 B2 | 6/2007 | Adelman et al. | | |
| 7,355,050 B2 | 4/2008 | Drysdale et al. | | |
| 2006/0069204 A1 * | 3/2006 | Drysdale et al. | ............ | 524/589 |
| 2006/0128774 A1 * | 6/2006 | Drysdale et al. | ............ | 514/375 |
| 2006/0128873 A1 * | 6/2006 | Drysdale et al. | ............ | 524/548 |

OTHER PUBLICATIONS

LuJean Burak, Advantages of the UV/EB Curing Process and Recommended Safety Practices, Mar. 27, 2001, Sartomer Co. (pp. 1-6) http://www.pcimag.com/Articles/Feature_Article/0168e8e5e56a7010VgnVCM100000f932a8c0.*
Malcolm P. Stevens, Polymer Chemistry: an Introduction, 1999, Oxford Press, 3$^{rd}$ ed. (p. 227).*
Sogah et al., "Group Transfer Polymerization. Polymerization of Acrylic Monomers", Macromolecules, vol. 20, 1987, pp. 1473-1488.

* cited by examiner

*Primary Examiner*—Mark Eashoo
*Assistant Examiner*—Jessica Paul

(57) ABSTRACT

The present invention relates to novel poly(meth)acrylate compositions formed by polymerization of (meth)acrylate amide acetals.

7 Claims, No Drawings

POLY(METH)ACRYLATE COMPOSITIONS CONTAINING AMIDE ACETALS

CROSS REFERENCE TO RELATED APPLICATION

This application claims the benefit of U.S. Provisional Application 60/615,361, filed Sep. 30, 2004.

FIELD OF THE INVENTION

The present invention relates to novel poly(meth)acrylate compositions formed by polymerization of (meth)acrylate amide acetals.

BACKGROUND OF THE INVENTION

Amide acetals have been used for example in copolymerization with polyisocyanates as disclosed in U.S. Pat. No. 4,721,767. Cross-linked amide acetal based coating compositions dry and cure rapidly without the potential problems created by VOC emissions. Such coatings can be very useful, for example, in the automotive coatings industry.

Co-owned and co-pending U.S. Patent Publication 2005-007461 describes polymeric compositions containing amide acetal groups, which are crosslinked by hydrolyzing the amide acetal groups, and subsequently reacting the hydroxyl groups and/or the amine functions that are formed to crosslink the composition.

Co-owned and co-pending U.S. patent application Ser. No. 10/960,656 describes a catalytic process for making amide acetals from nitrites and diethanolamines.

Co-owned U.S. patent application 60/615,362 describes novel (meth)acrylate amide acetals and processes to make them.

SUMMARY OF THE INVENTION

The present invention relates to a composition, comprising:

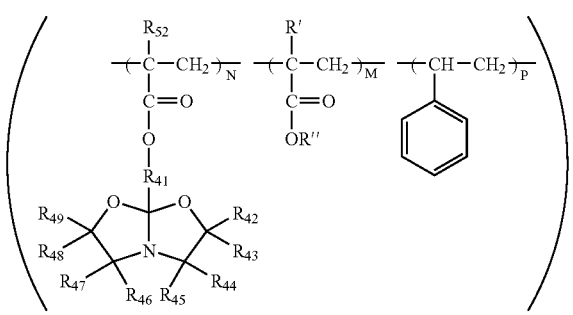

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, dialkylamino;

$R_{41}$ is $(CR_{50}R_{51})_n$, wherein $R_{50}$ and $R_{51}$ are each independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group;

n is 1-10;

$R_{52}$ is hydrogen or methyl;

R' is hydrogen or methyl;

R" is $C_1$-$C_{30}$ alkyl or $C_3$-$C_{30}$ aromatic; and

N, M and P represent percentages of 100% such that N+M+P=100%.

The present invention further relates to a process to make polymers comprising (meth)acrylate amide acetals, comprising reacting a (meth)acrylate amide acetal of the formula

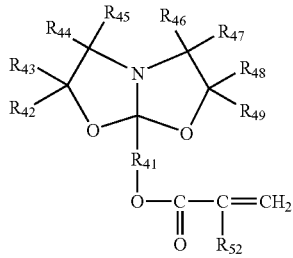

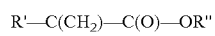

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino;

$R_{41}$ is $(CR_{50}R_{51})_n$, wherein $R_{50}$ and $R_{51}$ are each independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group $R_{52}$ is hydrogen or methyl; and n is 1 to 10.

The present invention further relates to a process wherein the (meth)acrylate amide acetal is reacted with one or more monomers selected from the group consisting of

R'—C(CH$_2$)—C(O)—OR"

where R' is hydrogen or methyl, and R" is $C_1$-$C_{30}$ alkyl groups or aromatic groups; styrene and substituted styrenes.

The invention further relates to a process wherein the product is represented by the formula

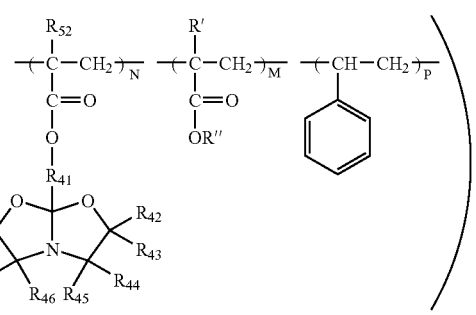

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino;

$R_{41}$ is $(CR_{50}R_{51})_n$, wherein $R_{50}$ and $R_{51}$ are each independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group n is 1 to 10;

$R_{52}$ is hydrogen or methyl;

R' is hydrogen or methyl;

R'' is $C_1$-$C_{30}$ alkyl or $C_3$-$C_{30}$ aromatic; and

N, M and P represent percentages of 100% such that N+M+P=100%.

The polymers of the present invention may be made by polymer formation processes including free radical polymerization and group transfer polymerization.

DETAILS OF THE INVENTION

The present invention relates to the preparation of poly(meth)acrylate amide acetals. The preparation of the (meth)acrylate amide acetals is described in co-owned and co-pending U.S. patent application 60/615362, hereby incorporated by reference in its entirety.

As described in U.S. patent application 60/615362, amide acetals have the general formula

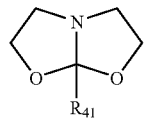

General processes for producing amide acetals are disclosed in co-owned and co-pending U.S. patent Publication 2005-007461 and application Ser. No. 10/960656. As disclosed in these applications, amide acetals can also be represented by the formula

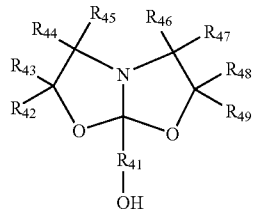

wherein $R_{42}$-$R_{49}$ independently represent a hydrogen, $C_1$-$C_{20}$ alkyl. $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino; and $R_{41}$ is $(CR_{50}R_{51})_n$, wherein $R_{50}$ and $R_{51}$ are each independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, where n is 1-10. It is more typical that $R_{42}$-$R_{49}$ each independently represent hydrogen and $C_1$-$C_{10}$ alkyl groups. This amide acetal is used to produce (meth)acrylate amide acetals by any of several methods, including transesterification, reaction with an acid halide or (meth)acrylate anhydride in the presence of a base.

With transesterification, the amide acetal would react with an ester such as

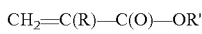

where R is hydrogen or methyl and R' is $C_1$-$C_{20}$ alkyl. Reaction with an acid halide, such as

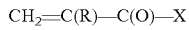

or a (meth)acrylate anhydride

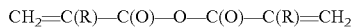

where each R is independently hydrogen or methyl and X is a halogen such as Cl or Br, in the presence of a base (e.g., triethylamine, pyridine) also gives the desired end-product. The formula for these (meth)acrylate amide acetals thus formed is

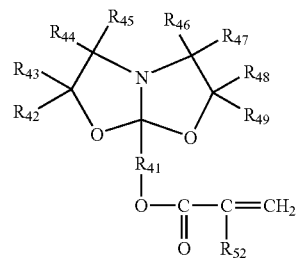

where $R_{52}$ is either hydrogen or methyl.

Generally, for a randomly dispersed polymer, the reactants are added together with a common solvent, such as ethyl acetate, butyl acetate, xylenes, toluene, propylene glycol monomethyl ether acetate. This solution can then be fed concurrently with a catalyst solution, usually an organic peroxide, to a reactor, under nitrogen, stirring with additional solvent, at the appropriate temperature. For appropriate organic peroxides, see Elf Atochem "Organic Peroxides", Product Bulletin, Philadelphia, Pa.

The (meth)acrylate amide acetals are then reacted with other monomers to form oligomers and polymers. By polymers herein are meant those entities with number average molecular weight from about 100 to about 100,000. Preferably, the number average molecular weight of the polymers is from about 100 to about 10000. By oligomers herein is meant those polymers which have a number average molecular weight less than about 3000.

While the (meth)acrylate amide acetals can be reacted with a number of monomers, particularly useful ones include those represented by the formula

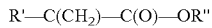

where R' is hydrogen or methyl, and R'' is $C_1$-$C_{30}$ alkyl groups or aromatic groups (e.g., phenyl). Additionally, monomers such as styrene

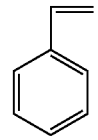

and substituted styrenes such as alpha-methyl styrene, can be reacted with the (meth)acrylate amide acetals.

The polymers of the present invention can be formed by any convenient process. As will be known by those skilled in the art, appropriate solvents, catalysts, initiators and the like will need to be employed to form the desired end products.

One process that may be employed is a free radical process, which will provide polymers of random structures; i.e., the monomers which are reacted together will form random polymers. Another process commonly used for polymerization is group transfer polymerization, which will provide designed polymer structures. See, for instance, D. Y. Sogah, et al., Macromolecules (1987), 20(7), 1473-88. Still another process that is useful is cobalt chain transfer polymerization, as described in U.S. Pat. No. 5,587,431.

When the monomers described above react to form polymers, their general structure will be

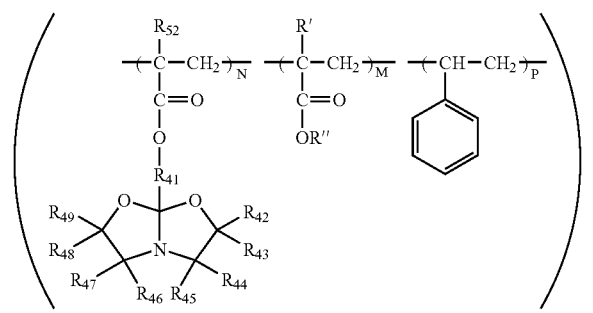

where N+M+P=100%. Therefore, depending on the amounts of monomers added, the resulting polymer can be homopolymeric (i.e., N=100%, and M and P are each 0%) or heteropolymeric (when at least 2 of N, M and P are not 0%.

The materials made by the processes disclosed are novel, and may be used to produce novel coatings.

These and other features and advantages of the present invention will be more readily understood, by those of ordinary skill in the art, from a reading of the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner slight variations above and below the stated ranges can be used to achieve substantially the same results as values within the ranges. Also, the disclosure of these ranges is intended as a continuous range including every value between the minimum and maximum values.

Unless otherwise stated, all chemicals and reagents were used as received from Aldrich Chemical Co., Milwaukee, Wis.

EXAMPLES

Example 1

In a dry flask styrene (90.36 g), methyl methacrylate (120.49 g), isobornyl methacrylate (280.16 g), 2-methyl-acrylic acid 2,6-dimethyl-tetrahydro-oxazolo[2,3-b]oxazol-7a-ylmethylester (111.63 g)—monomer solution. In a separate dry flask butyl acetate (59.55 g) and Vazo 67 (14.95 g) were added—catalyst solution.

To a dried flask equipped with a mechanical stirrer, a reflux condenser and under nitrogen was butyl acetate (178.89 g). This solvent was then heated to 100° C. To the stirred solvent maintained at 100° C. were added concurrently the above monomer solution at a rate of 3.31 g/min (addition over ~3 hours) and the above catalyst solution at a rate of 0.31 g/min (addition over ~4 hours). The polymerized solution was held at 100° C. for 30 minutes after completion of the catalyst solution and then cooled to room temperature. GPC analyses of the resulting polymer showed the polymer to contain very little residual monomers, having bimodal distribution, with Mn=9344 and Mw=20651.

Example 2

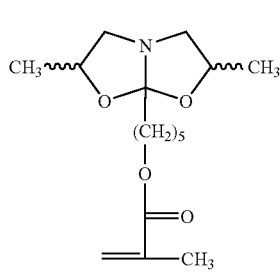

In a dry flask styrene (59.60 g), methyl methacrylate (79.3 g), isobornyl methacrylate (167.5 g), 2-methyl-acrylic acid 5-(dimethyl-tetrahydro-oxazolo[2,3-b]oxazol-7a-yl)-pentyl ester(90.8 g) and butyl acetate were mixed—monomer solution. In a separate dry flask butyl acetate (88.53 g) and Vazo 67 (10.82 g) were added—catalyst solution.

To a dried flask equipped with a mechanical stirrer, a reflux condenser and under nitrogen was butyl acetate (118.1 g). This solvent was then heated to 100° C. To the stirred solvent maintained at 100° C. were added concurrently the above monomer solution at a rate of 3.31 g/min (addition over ~3 hours) and the above catalyst solution at a rate of 0.31 g/min (addition over ~4 hours). The polymerized solution was held at 100° C. for 30 minutes after completion of the catalyst solution and then cooled to room temperature. An additiional 103 g of butyl acetate was added. GPC analyses of the resulting polymer showed the polymer to contain almost no residual residual monomers, with Mn=6255 and Mw=13049, PD=2.08.

What is claimed is:

1. A composition, comprising:

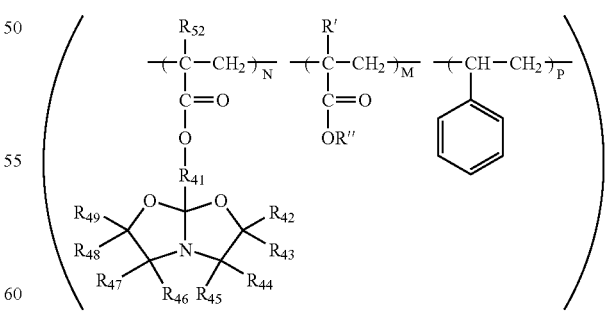

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino;

$R_{41}$ is $(CR_{50}R_{51})_n$, wherein $R_{50}$ and $R_{51}$ are each independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group;

n is 1 to 10;

$R_{52}$ is hydrogen or methyl;

R' is hydrogen or methyl;

R" is $C_1$-$C_{30}$ alkyl or $C_3$-$C_{30}$ aromatic; and

N, M and P represent percentages of 100% such that N+M+P=100%.

2. A process to make polymers comprising (meth)acrylate amide acetals, comprising reacting a (meth)acrylate amide acetal of the formula

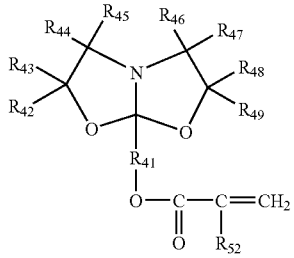

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino;

$R_{41}$ is $(CR_{50}R_{51})_n$, wherein $R_{50}$ and $R_{51}$ are each independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group;

$R_{52}$ is hydrogen or methyl;

and n is 1-10.

3. The process of claim 2, wherein the (meth)acrylate amide acetal is reacted with one or more monomers selected from the group consisting of

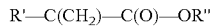
R'—C(CH$_2$)—C(O)—OR"

where R' is hydrogen or methyl, and R" is $C_1$-$C_{30}$ alkyl groups or aromatic groups; styrene and substituted styrenes.

4. The process of claim 3, wherein the product is represented by the formula

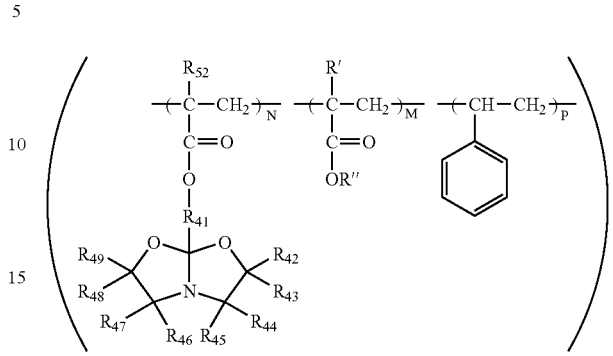

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino;

$R_{41}$ is $(CR_{50}R_{51})_n$, wherein $R_{50}$ and $R_{51}$ are each independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group; n is 1-10;

$R_{52}$ is hydrogen or methyl;

R' is hydrogen or methyl;

R" is $C_1$-$C_{30}$ alkyl or $C_3$-$C_{30}$ aromatic; and

N, M and P represent percentages of 100% such that N+M+P=100%.

5. The process of claim 4, wherein said process is a free radical process.

6. The process of claim 4, wherein said process is a group transfer polymerization process.

7. The process of claim 4, wherein said process is a cobalt chain transfer polymerization process.

* * * * *